United States Patent [19]

Hunter

[11] 3,771,690

[45] Nov. 13, 1973

[54] OVERFILL LIMITING APPARATUS AND LIQUID VAPOR SEPARATOR

[75] Inventor: William A. Hunter, Royal Oak, Mich.

[73] Assignee: Chrysler Corporation, Highland Park, Mich.

[22] Filed: Mar. 17, 1972

[21] Appl. No.: 235,582

[52] U.S. Cl. ............... 220/85 VR, 123/136, 137/43, 55/385
[51] Int. Cl............................................ B65d 25/00
[58] Field of Search .................... 220/85 VR, 85 VS; 123/136; 137/43; 55/385

[56] References Cited
UNITED STATES PATENTS

| | | | |
|---|---|---|---|
| 3,653,537 | 4/1972 | Shiolara et al. | 220/85 VR |
| 3,672,537 | 6/1972 | Kitzner | 220/85 VR |
| 3,695,243 | 10/1972 | Torazza | 220/85 VR |

Primary Examiner—George T. Hall
Attorney—Oliver F. Arret

[57] ABSTRACT

Overfill limiting means for motor vehicle fuel tanks in the form of a normally closed vapor pressure operated valve in a vent line extending from the tank and liquid-vapor separator means having improved construction and function.

8 Claims, 4 Drawing Figures

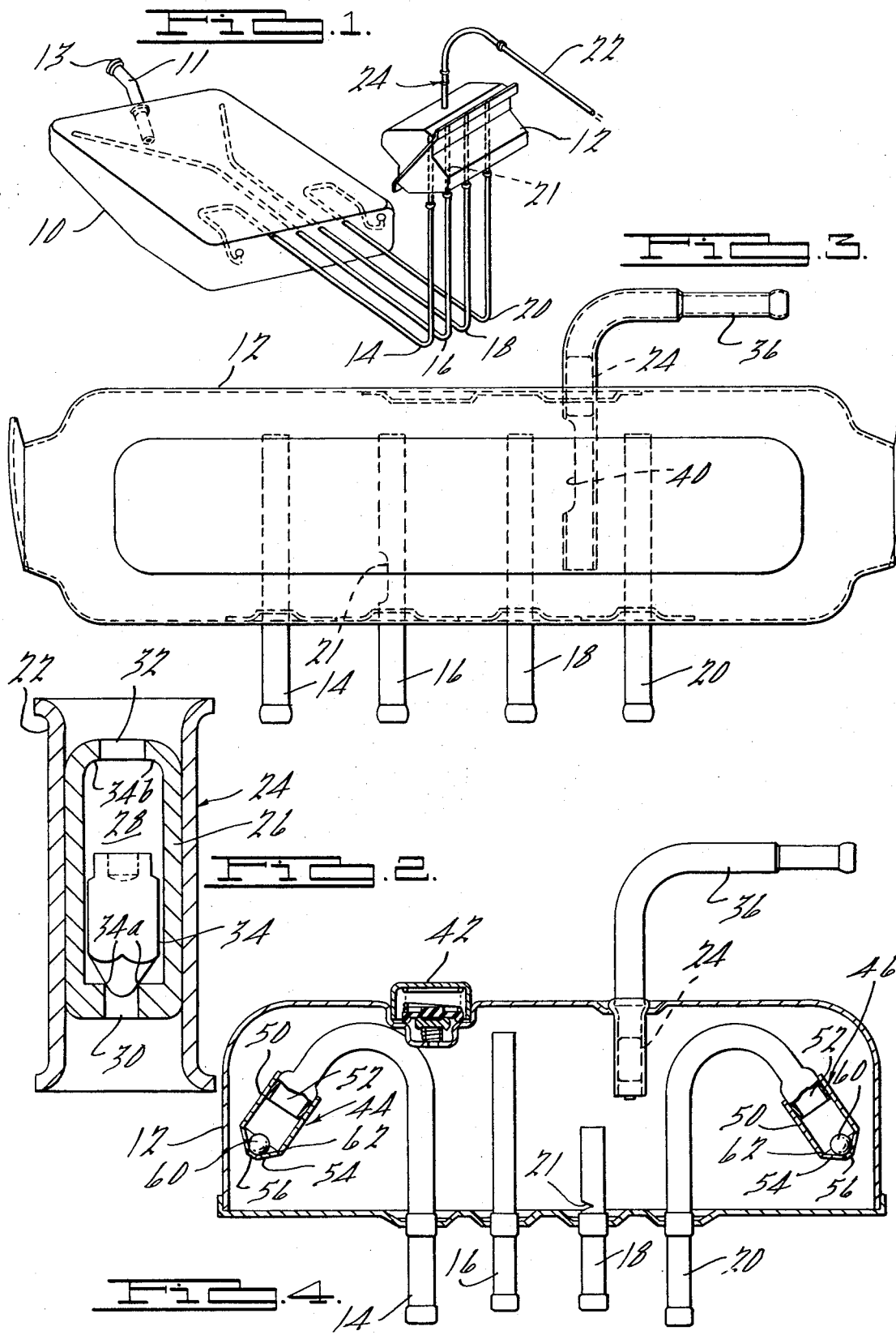

OVERFILL LIMITING APPARATUS AND LIQUID VAPOR SEPARATOR

BACKGROUND

This invention relates to fuel tank venting and evaporative control of fuel for motor vehicles. Evaporative losses of hydrocarbons from motor vehicle fuel tanks contribute to the unburned hydrocarbons emitted to the atmosphere. There have been many attempts to contain these emissions by discontinuing the practice of venting motor vehicle fuel tanks directly to the atmosphere. Today, motor vehicles normally include a vapor storage means for collecting and storing fuel tank vapors and routing them to the motor vehicle engine when it is operating. In such a system, one or more vent lines usually communicate with the fuel tank where fuel vapors tend to collect. The vapors flow through the vent line or lines to the vapor storage means where they are held until they are routed to the engine and burned.

With these systems, however, it has been found necessary to provide some means to prevent overfilling of the fuel tank and the carryover of liquid fuel through the vent lines to the vapor storage means. In the typical vented tank, as fuel enters the tank through the filler pipe, it displaces air and vapors therein. The air and vapors attempt to leave the tank by flowing out of the filler tube or through the vent lines. In such an arrangement the fuel may completely displace the air and vapors in the tank filling it to the top and also filling the filler pipe. The liquid fuel may then flow through the vent line or lines particularly upon thermal expansion of the fuel in the tank, or changes in attitude of the vehicle and maneuvering inertia forces. This is undesirable and is to be avoided.

One solution to this problem has been disclosed in U. S. Pat. No. 3,517,654 entitled "Evaporative Emission Control System" which issued to Jorma O. Sarto and William A. Hunter on June 30, 1970. The solution proposed therein comprised a small container carried inside the fuel tank at its top. The auxiliary container included a small hole in its bottom for allowing fuel to leak into the auxiliary container as the main tank filled and a small hole at the top to allow vapors contained therein to escape to the main tank. By making the inlet hole of the auxiliary chamber extremely small, the filling of the auxiliary chamber was delayed thereby allowing the main fuel tank to be filled without filling the auxiliary chamber. This delay provided an overfill limiting arrangement wherein the level in the main fuel tank would drop after filling as fuel flowed into the auxiliary chamber. This assured the presence of a vapor space or vapor volume in the top of the main tank, maintaining a separation between the liquid fuel and the vent line or lines communicating with the tank in this space.

Although this solution has been satisfactory, continued development has been carried on in the hope of obtaining a less expensive structural arrangement for preventing overfill of the tank.

Another solution, disclosed in co-pending application Ser. No. 90,534, filed in the name of William A. Hunter and entitled "Overfill Limiting Apparatus for Fuel Tank," provides a normally closed valve means in the vent line which communicates between the fuel tank and the vapor storage means. The valve is constructed and arranged to be operated by vapor pressure originating in the fuel tank. It opens when a predetermined pressure exists inside the tank. The pressure required is one which is greater than the pressure created by a filled tank. This invention in its most general aspect provides an improvement in the design disclosed in the copending application for providing the normally closed valve means with an extra valve seat for limiting the "surging" flow action of fuel in the fuel tank, vent lines and the like.

The invention also provides an improved liquid vapor separator arrangement for use in the vent system along with the improved overfill limiting valve.

BRIEF DESCRIPTION OF THE DRAWING

FIG. 1 is a perspective view of a motor vehicle fuel tank embodiment showing a fuel venting system;

FIG. 2 is a sectional view of the improved overfill limiting valve;

FIG. 3 is a rear view of a liquid-vapor separator;

FIG. 4 is a sectional view of another liquid-vapor separator having integral construction and other additional features;

DESCRIPTION OF THE PREFERRED EMBODIMENTS

In FIG. 1, liquid-vapor separator 12 is mounted higher than tank 10 as shown and may be conveniently positioned within the rear automobile "kick-up" (not shown). Fuel tank 10 includes vent means, such as the four vent lines 14, 16, 18 and 20, the ends of which terminate and are generally respectively positioned in each of the upper fuel tank corners as shown. The open ends of the vent lines allow fuel vapors and air, which tend to collect in the top of the tank, to flow to the liquid vapor separator 12. One of the lines, for example 16, may be slotted near the separator floor as shown at 21 to provide a drain-back means in separator 12 by means of which liquid fuel carried over into the separator by the vent lines may be returned to the fuel tank. Liquid vapor separator 12 also includes an additional vent line 22 which communicates with the vapor storage means carried on the motor vehicle and may for example be the engine crankcase (not shown). Vapor collected in the vapor liquid separator 12 from fuel tank 10 may thus pass over vent line 22 to be stored in the vapor storage means.

Vent line 22 includes normally closed pressure operated valve means 24. With reference to FIG. 2, valve means 24 can be described in detail. The valve consists of a valve body 26 which includes an axial cylindrical passageway 28 therethrough. Passage 28 includes inlet opening 30 and outlet opening 32 as shown. Inlet opening 30 provides a first or lower seat 34a for valve closure member 34 which is slidably carried within passageway 28. Valve closure member 34 consists of a mass which is positioned by the force of gravity normally as shown against seat 34a. Preferably, the closure member will be a rectangular parallelepiped in cross-section while the valve body will be cylindrical or circular in cross-section in the flow passage 28, thus positioning the closure member axially therein but allowing space for vapors to flow by.

As shown, closure member 34 is freely slidable or movable within passageway 28. When mounted in the vertical position as shown in FIG. 2, the valve will assume the normally closed condition since closure member 34 will seat against inlet opening 30 at 34a thus closing the valve to the flow of vapors from the fuel tank. Pressure against the bottom of closure member 34 at inlet 30 will raise closure member 34 from seat 34a thus opening valve 24 and allowing the passage or flow of vapors therethrough. However, the forces of the pressure must exceed the weight or mass of closure member 34. A second or upper seat 34b is provided for closure member 34 at outlet 32. The purpose of this seat is to prohibit the flow of liquid fuel through passageway 28 into line 22 under surging conditions. If the vehicle is stopped or started suddenly or undergoes other violent maneuvers, any liquid fuel in the lines and in the liquid vapor separator 12 will tend to surge through passageway 22. The surge will force member 34 against upper seat 34b thus closing the valve without allowing liquid fuel to enter line 22.

In operation of the overfill limiting arrangement, with valve 24 mounted in the vertical normally closed position, and a filler tube extending downwardly into the tank, air and fuel vapors in the fuel tank will be trapped during filling when the fuel level rises above the open end of the filler tube. The vapors will be forced to the top of the tank when the fuel reaches the leve at which the fuel itself seals off the lower end of the filler pipe and prevents the escape of air and vapors from the tank. The vent system is also sealed since valve 24 is closed. Continued filling of the tank compresses the vapors therein creating a pressure which is substantially equal to the head pressure established by the fuel in the filler pipe itself. At this time, the tank appears to be full to the station attendant because the filler pipe is full and will accept no more fuel. However, in the tank there will be a space at the top containing trapped vapors. The size or volume of the space will depend on the depth of penetration of the filler pipe into the tank, its overall length and the pressure at which the overfill limiting valve 24 is operative.

It is necessary that the normally closed valve 24 open only at a predetermined pressure which is greater than the pressure created by the head of fuel in the filler pipe when the fuel tank is filled. Therefore, when full, the tank is sealed, the valve is closed and there is a vapor collection space and thermal expansion space at the top of the tank. With evaporation and thermal expansion pressure, the pressure in the tank increases to a value greater than the head pressure and ultimately causes valve 24 to open by overcoming the weight of valve closure member 34 and lifting it from its seat 34a at inlet 30. Vapor then flows through the valve and vent line to the vapor storage means until the pressure drops below the predetermined operative pressure point of the valve at which time it will again assume the normally closed condition.

It can be seen then that this valve arrangement provides a relatively simple and inexpensive overfill limiting means which causes vapor to be trapped in the fuel tank during filling thus assuring the presence of a vapor space in the top of the tank and the separation of liquid fuel from the vent lines. The overfill limiting means is also operable at certain pressures to relieve the pressure in the tank and allow vapor flow to a vapor storage means in an evaporative control system. However, there is also provided and anti-surging feature in the valve by virtue of the upper seat 34band the closing action which occurs when closure member 34 contacts this seat. Surging is caused by sudden changes in movement of the vehicle or pressure changes in the vent system. With such changes any liquid fuel present in the vent lines or liquid-vapor separator will move rather suddenly and might flow into vent line 22 but for the presence of the improved valve 24 with additional seat 34b which closes when surging liquid fuel lifts closure member 34 upwardly seating its top at seat 34b.

FIG. 3 shows liquid-vapor separator 12 in more detail. In this embodiment improved valve 24 is incorporated into an elbow 36 which extends upwardly from the top portion of the liquid-vapor separator and terminates in a portion adapted to be connected to line 22 as shown. The lower portion of elbow 36 extends into the separator and contains a large opening 40 through which vapors may enter the elbow and pass to line 22. This arrangement may be conveniently fabricated in one piece at the same time with the elbow containing valve 24 being sealed into the separator unit.

Referring to FIG. 4 an even more complete integrated unit according to the invention is shown which simplifies the manufacture and installation of these vapor control systems. Valve 24 is included as before. In addition, a pressure-vacuum relief valve 42 is mounted in separator 12. This relief valve is the same type presently used in gasoline fuel tank caps. The valve opening at certain vacuum levels such as 7 to 14 inches of water and at certain pressure levels such as 14 to 18 inches of water. The advantage of permanently installing such a valve in the liquid-vapor separator is that its pressure is permanently insured as opposed to having it in the filler cap at the fuel tank filler tube. Thus an ordinary sealing cap can be used and easily replaced if lost.

There is also included in separator 12 two positionally responsive valves 44 and 46 of the type disclosed in copending application Ser. No. 55,543 now U.S. Pat. No. 3,698,160 entitled "Motor Vehicle Fuel Tank Venting," although in that application the valves are incorporated into the fuel tank. The valves are included in vent lines 14 and 20 as shown in FIG. 4. These lines vent the forward portion of the fuel tank as can be seen in FIG. 1.

In operation, when the vehicle assumes uphill, downhill or canted attitudes, valves 44 and 46 close thus preventing the flow of liquid fuel through vent lines 14 and 20 and avoiding the filling of liquid vapor separator 12 with liquid fuel. When the vehicle assumes an uphill position, liquid fuel is unable to flow through any of the vent lines 14, 16, 18 or 20 since the liquid vapor separator 12 is above fuel tank 10. When the vehicle is canted to the left or right, valves 44 and 46 close. Since the forward vents are closed by valves 44 and 46 whenever liquid fuel carryover is possible, the only liquid fuel carryover to vapor liquid separator 12 which can occur is through rear vent lines 16 and 18. Only very small amounts of carryover are possible by these vent lines since they open into the upper rear corners of the tank and carryover does not occur in the downhill or uphill position of the motor vehicle. With the arrangement shown, the need for a lengthy standpipe is obviated and the liquid-vapor separator may be mounted in a lower position, such as within the "kick-up." Furthermore, the amount of liquid carryover is drastically limited.

The preferred positionally responsive valve 44 or 46 used can be seen from FIG. 4 to include a valve body 50 mounted at the terminus of vent line 14 and vent line 20 so as to be in the normally open position when the separator is substantially horizontal or in any desired predetermined position.

Valve body 50 includes an open upper end 52 for receiving vapors from a fuel tank. Opening 52 leads to a conical valve seat 54 which tapers to an open truncated lower end 56. Lower end 56 opens into separator 12. Valve seat 54 carries a spherical closure member or ball 60 in a freely rolling seat 54. When valve body 50 is oriented normally, i.e., horizontally, the valve assumes it normally open position in which ball 60 rests at the upper end of conical valve seat 54 against the peripheral abutment area 62 and fuel vapors or the like may flow through the valve. When valve body 50 is oriented as shown in FIG. 4, in a relatively shallow angle from the vertical, ball 60 will seat itself at the bottom of conical seat 54 sealing the truncated lower end opening 56 thus closing the valve and prohibiting the flow of fuel, i.e., liquid or vapor, therethrough. It will be obvious that the positional response of the valve may be adjusted to open and close at various predetermined angles depending on the angular design of the conical valve seat and the relative size and weight of the ball closure member.

Valve body 50 may be made of any material such as metal or plastic. However, it is preferred that the valve seat 54 be made of a non-corrosive material such as brass and that the closure member 60 be made of a relatively heavy material such as brass also so as to be most responsive to positional changes.

There is thus provided a separator unit which incorporates in one container all of the control features necessary to control evaporative and other vapor loss in a fuel tank vent system, making the overall system easier and cheaper to manufacture and install in the vehicle.

The embodiments of the invention in which an exclusive property or right is claimed are defined as follows:

1. A motor vehicle fuel tank vent system comprising:
   a fuel tank;
   a filler tube extending into the fuel tank to a depth of penetration which provides a vapor space in the top of the tank and a certain head of fuel in the filler tube when the tank is full;
   a vapor storage means;
   vent line means connected between the fuel tank and vapor storage means, and
   normally closed pressure operated valve means in the vent line, the valve means being opened by pressure in the fuel tank greater than the pressure developed when the tank is substantially full of fuel including the head of the fuel in the filler tube whereby overfilling of the tank is limited and vapor is periodically allowed to flow from the tank to the vapor storage means as the valve means opens,
   the valve means including a vertically mounted valve body having an upright axial passage therein and including a lower inlet opening with a surface forming a lower closure seat and an upper outlet opening with a surface forming an upper closure seat, and
   an axially movable valve closure member carried in the passage, the closure member being normally seated on the lower seat due to its weight, the closure member being so shaped as to have lateral portions thereof spaced from the passage wall to allow vapor to flow past the member and through the valve body when the closure member is raised from the seat by excess pressure in the tank, the closure member seating against the upper seat when liquid fuel surging occurs.

2. The system according to claim 1 wherein the valve closure member is a rectangular parallelepiped in cross-section, the valve body is circular in cross-section, and the corners thereof contact the passage wall to properly position the closure member therein.

3. In a vented fuel tank system for motor vehicles of the type comprising:
   a fuel tank,
   front and rear vent means positioned in the upper portion of the tank for receiving vapor from the fuel therein;
   a liquid-vapor separator including a container for receiving vapor and carryover liquid fuel from the tank,
   vent lines extending between the vent means in the tank and the liquid-vapor separator for transmitting the vapor and liquid fuel from one to the other,
   drain-back means connected between the liquid-vapor separator and the fuel tank for returning liquid fuel from the separator to the tank, and
   vapor conduit means extending from the liquid-vapor separator for directing vapor to a vapor receiving means,
   the improvement comprising: positionally responsive valve means carried in the separator by the terminal portion of the front vent means for controlling the flow of vapor and liquid fuel into the front vent means, the valve means being normally open when the tank is in a substantially horizontal position and closed when the position is changed.

4. The combination according to claim 3 wherein the positionally operated valve means comprises:
   at least one valve body including:
   a conical valve seat in the valve body defining an open upper end and tapering to an open truncated lower end smaller in diameter than the upper end,
   a peripheral abutment disposed about the upper end of the seat, and
   a freely rolling spherical closure member carried on the seat, the diameter of the closure member being smaller than the diameter of the upper end of the seat but larger than the diameter of the lower end of the seat.

5. The combination according to claim 3 wherein the fuel tank has the general form of a rectangular parallelpiped, and
   the vent means comprises four vent lines, one opening into each of the four upper tank corners to provide a pair of front vents and a pair of open rear vents in the tank.

6. The combination according to claim 3 wherein the positionally operated valve means comprises two valves, one being mounted on each of the front vent lines, each valve including:
   a valve body,
   a conical valve seat in the valve body defining an open upper end and tapering to an open truncated lower end smaller in diameter than the upper end,
   a peripheral abutment disposed about the upper end of the seat, and
   a freely rolling spherical closure member carried on the seat, the diameter of the closure member being smaller than the diameter of the upper end of the seat but larger than the diameter of the lower end of the seat.

7. The combination according to claim 3 including a pressure-vacuum relief valve carried by the separator.

8. The combination according to claim 7 including:
normally closed pressure operated valve means in the vent line, the valve means being opened by pressure in the fuel tank greater than the pressure developed when the tank is substantially full of fuel including the head of the fuel in the filler tube whereby overfilling of the tank is limited and vapor is periodically allowed to flow from the tank to the vapor storage means as the valve means opens, the valve means including a vertically mounted valve body having an upright axial passage therein and including a lower inlet opening with a surface forming a lower closure seat and an upper outlet opening with a surface forming an upper closure seat, and an axially movable valve closure member carried in the passage, the closure member being normally seated on the lower seat due to its weight, which is such relative to the head of the fuel in the fuel tank whereby closing of the valve occurs when the tank is full, the closure member being so shaped as to have lateral portions thereof spaced from the passage wall to allow vapor to flow past the member and through the valve body when the closure member is raised from the seat by excess pressure in the tank, the closure member seating against the upper seat when liquid fuel surging occurs.

\* \* \* \* \*